United States Patent
Tonogai

(10) Patent No.: US 7,140,071 B2
(45) Date of Patent: Nov. 28, 2006

(54) ELECTRIC MOTORIZED HINGE APPARATUS

(75) Inventor: Yoshihide Tonogai, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/860,420

(22) Filed: Jun. 2, 2004

(65) Prior Publication Data

US 2005/0050683 A1    Mar. 10, 2005

(30) Foreign Application Priority Data

Sep. 5, 2003    (JP)    ............................ P2003-314385

(51) Int. Cl.
    *E05F 1/08*    (2006.01)
(52) U.S. Cl. .............................. 16/325; 16/326; 16/354
(58) Field of Classification Search .................. 16/242, 16/249, 250, 255, 277, 285, 341, 342, 354, 16/356, 305, 312, 325, 326; 403/119, 120; 379/433.11–13, 433, 428; 455/90, 550, 556, 455/575; 361/801–804, 680–683
    See application file for complete search history.

(56) References Cited

U.S. PATENT DOCUMENTS

| 5,125,131 A * | 6/1992 | Leblanc ........................ 16/330 |
| 5,444,877 A * | 8/1995 | Kumarasurier ............... 4/246.1 |
| 5,649,309 A * | 7/1997 | Wilcox et al. ........... 455/575.3 |
| 6,256,481 B1 * | 7/2001 | Jeong et al. ............. 455/575.3 |
| 6,459,887 B1 * | 10/2002 | Okuda ........................ 455/90.1 |
| 6,628,974 B1 | 9/2003 | Lim |
| 6,785,935 B1 * | 9/2004 | Ahn et al. ..................... 16/221 |
| 2004/0154130 A1 * | 8/2004 | Lee et al. ..................... 16/330 |
| 2004/0203522 A1 * | 10/2004 | Lim .......................... 455/90.3 |
| 2004/0216273 A1 * | 11/2004 | Kang et al. ................... 16/264 |

FOREIGN PATENT DOCUMENTS

| JP | 11-112630 | 4/1999 |
| JP | 3079820 | 6/2001 |
| KR | 20-0174766 | 3/2000 |

* cited by examiner

*Primary Examiner*—Robert J. Sandy
*Assistant Examiner*—Andre L. Jackson
(74) *Attorney, Agent, or Firm*—Beyer Weaver & Thomas LLP

(57) ABSTRACT

In an electric motorized hinge apparatus, a biasing means maintains a concavo-convex engagement state between a third rotating member and a second engagement portion in a second rotating member, and thus the second rotating member rotates to follow the third rotating member. Furthermore, the biasing means maintains a concavo-convex holding state between a first engagement portion in the second rotating member and a first rotating member, and thus the first rotating member rotates to follow the second rotating member. Furthermore, as the first rotating member rotates, a lid portion rotates to follow it. During manual rotation of the lid portion, a motor is maintained in an off state and the second rotating member is kept at a stop by a lock means. Therefore, the engagement state at the first concavo-convex engagement part is released by the manual rotation of the lid portion, so that the lid portion can be freely rotated by hand.

7 Claims, 6 Drawing Sheets

ELECTRIC MOTORIZED HINGE APPARATUS

BACKGROUND OF THE INVENTION

1. Field of the Invention

The present invention relates to an electric motorized hinge apparatus utilized in an operation of opening and closing a lid or the like mounted, particularly, in cell phones, personal digital assistants, notebook computers, and so on.

2. Related Background Art

The conventional technology in this field is one in Korean Utility Model No. 20-0174766. A cell phone described in this official gazette discloses an electric motorized hinge apparatus, and this hinge apparatus is housed in a hinge connection between the main body with a numeric keypad and a lid part (movable object) with a screen so as to enable electric opening and closing of the lid part of the cell phone. Since this hinge apparatus needs to be housed in the hinge part of the cell phone, a miniature motor is utilized. In consequence of the miniature motor, it is necessary to increase torque, and a geared motor is adopted in order to make up for the lack of torque. For permitting the electric opening/closing and manual opening/closing of the lid part, a projection is provided at an end of an output shaft of the geared motor, while a recess for the projection to be fitted therein is provided on the lid side. Therefore, the lid part is opened and closed by engagement force between the projection and the recess in the electric opening/closing, and the projection is disengaged from the recess in the manual opening/closing, so as to permit free opening/closing of the lid part.

Patent Document 1: Korean Utility Model No. 20-0174766

Patent Document 2: Japanese Utility Model No. 3079820

Patent Document 3: Japanese Patent Application Laid-Open No. 11-112630

SUMMARY OF THE INVENTION

However, the conventional electric motorized hinge apparatus described above had the following problem. Namely, if the engagement force between projection and recess is set rather too strong, the concavo-convex engagement will become less likely to break in the electric opening/closing of the lid part, thus it will become harder to manually open and close the lid part. Furthermore, if in the electric opening/closing of the lid part a user forcedly stops the opening/closing thereof, the gear mechanism can be damaged. In contrast to it, if the engagement force between projection and recess is set rather too weak, the gear mechanism will become less likely to be damaged even in cases where in the electric opening/closing of the lid part the user forcedly stops the opening/closing operation, but there will occur cases where the concavo-convex engagement is broken during the electric opening/closing of the lid part. In this manner, the electric hinge apparatus requires consideration for satisfying both of avoidance of the damage to the gear mechanism and ease of opening/closing of the lid part in the manual operation, and thus had the problem that it was hard to miniaturize the apparatus, in view of the two types of opening/closing operations, the manual opening/closing and the electric opening/closing of the lid part.

An object of the present invention is to provide an electric motorized hinge apparatus constructed so as to suit compactification, particularly, in consideration of two types of rotating operations, manual rotation and electric rotation of a movable object.

In order to achieve the above object, an electric motorized hinge apparatus according to the present invention is an electric hinge apparatus for rotating a movable object by a motor provided with a gear mechanism, the electric hinge apparatus comprising: a first rotating member rotatably attached to an output shaft interlocking with the gear mechanism, the first rotating member being adapted to be coupled to the movable object; a second rotating member rotatably attached to the output shaft and coupled through a first concavo-convex engagement part to the first rotating member; a third rotating member adapted to integrally rotate together with the output shaft and coupled through a second concavo-convex engagement part to the second rotating member; biasing means located between a first engagement portion provided in the second rotating member and a second engagement portion provided in the second rotating member, the biasing means being adapted to press the first engagement portion against the first rotating member and to press the second engagement portion against the third rotating member; and lock means for locking the second rotating member during a stop of the motor.

This electric motorized hinge apparatus is provided with the gear mechanism in view of the lack of torque of the motor itself and involves consideration to avoidance of damage to the gear mechanism and ease of rotation of the movable object during manual operation. When the motor is turned on in order to electrically rotate the movable object, the third rotating member starts rotating with rotation of the output shaft. On this occasion, the biasing means maintains a concavo-convex engagement state between the third rotating member and the second engagement portion in the second rotating member, so that the second rotating member also rotates to follow the third rotating member. Furthermore, the biasing means maintains a concavo-convex holding state between the first engagement portion in the second rotating member and the first rotating member, so that the first rotating member rotates to follow the second rotating member. Furthermore, as the first rotating member rotates, the movable object also rotates to follow it. In this manner, the rotating force of the output shaft is sequentially transferred from the third rotating member to the first rotating member. Even in a case where in the middle of electric rotation of the movable object the user forcedly stops the rotation, the third rotating member continues idling, while the engagement is released at the second concavo-convex engagement part having a holding force weaker than that of the first concavo-convex engagement part. As a consequence, the output shaft can continuously maintain rotation, so as to apply no excessive load to the gear mechanism, thereby avoiding an incident of damage to the gear mechanism. On the other hand, when the user manually rotates the movable object, the motor is maintained in an off state and the second rotating member is kept at a stop by the lock means. Therefore, the engagement state of the first concavo-convex engagement part is released by the manual rotation of the movable object, so that the movable object can be freely rotated by hand. The electric hinge apparatus of this structure involves the consideration to the two types of rotation operations consisting of the manual rotation and electric rotation of the movable object, while making up for the lack of torque of the miniature motor, and is extremely effective in promotion of miniaturization.

Preferably, the biasing means comprises: a first compression spring located so as to surround the output shaft between the first engagement portion and the second engagement portion, the first compression spring having one end in contact with the first engagement portion and another end in contact with the second engagement portion; and a second compression spring located inside the first compression spring so as to surround the output shaft between the first engagement portion and the second engagement portion, the second compression spring having one end in contact with the first engagement portion and another end in contact with a spring seat provided on the output shaft.

By adopting the first compression spring and the second compression spring as described above, forces of the two springs are imparted to the first concavo-convex engagement part, and a force of one spring to the second concavo-convex engagement part. Therefore, the holding force of the second concavo-convex engagement part becomes weaker than that of the first concavo-convex engagement part, whereby a force of manually rotating the movable object, i.e., a so-called manual rotational force can be raised, while decreasing the torque load at a start of the motor. This configuration is effective in opening/closing of the lid part in the cell phones, personal computers, and so on.

Preferably, the lock means comprises: a stopper member located adjacent to the third rotating member and adapted to slide in a thrust direction along the output shaft; a claw portion projecting in the thrust direction from the stopper member; a pocket portion provided in the second engagement portion in the second rotating member and adapted to permit a tip of the claw portion to be inserted in the thrust direction; biasing means for biasing the stopper member toward the second rotating member; and an unlocking cam portion projecting in the thrust direction from the third rotating member, located between the second engagement portion and the stopper member, toward the stopper member and adapted to move the stopper member in the thrust direction against a biasing force of the biasing means.

By adopting this configuration, when the motor is turned on, the unlocking cam portion rotates together with the third rotating member in conjunction with the rotation of the output shaft. At this time, the cam portion pushes the stopper member against the biasing force, whereupon the claw portion of the stopper member moves in the thrust direction. As a result, the claw portion leaves the pocket portion provided in the second engagement portion to release the locking state, whereby the second rotating member goes into a freely rotatable state. Thus the second rotating member rotates to follow the third rotating member. As the second rotating member starts rotating, the pocket portion also moves in the rotating direction. As a result, even if the stopper member is returned by the biasing means, the claw portion will not go into the pocket portion and will be kept continuously in contact with the second rotating member, so as to maintain the rotating state of the first and second rotating members. Thereafter, at a point of time when the claw portion moves into the pocket portion continuously moving, the rotation of the first and second rotating members is forcedly stopped, so as to bring the second rotating member into a lock state.

BRIEF DESCRIPTION OF THE DRAWINGS

The present invention may be more readily described with reference to the accompanying drawings, in which.

DESCRIPTION OF THE PREFERRED EMBODIMENTS

The knowledge of the present invention can be readily understood in view of the following detailed description with reference to the accompanying drawings presented for illustrative purposes only. The following will describe embodiments of the present invention with reference to the accompanying drawings. The same portions will be denoted by the same reference symbols as much as possible, without redundant description.

Figure 1:
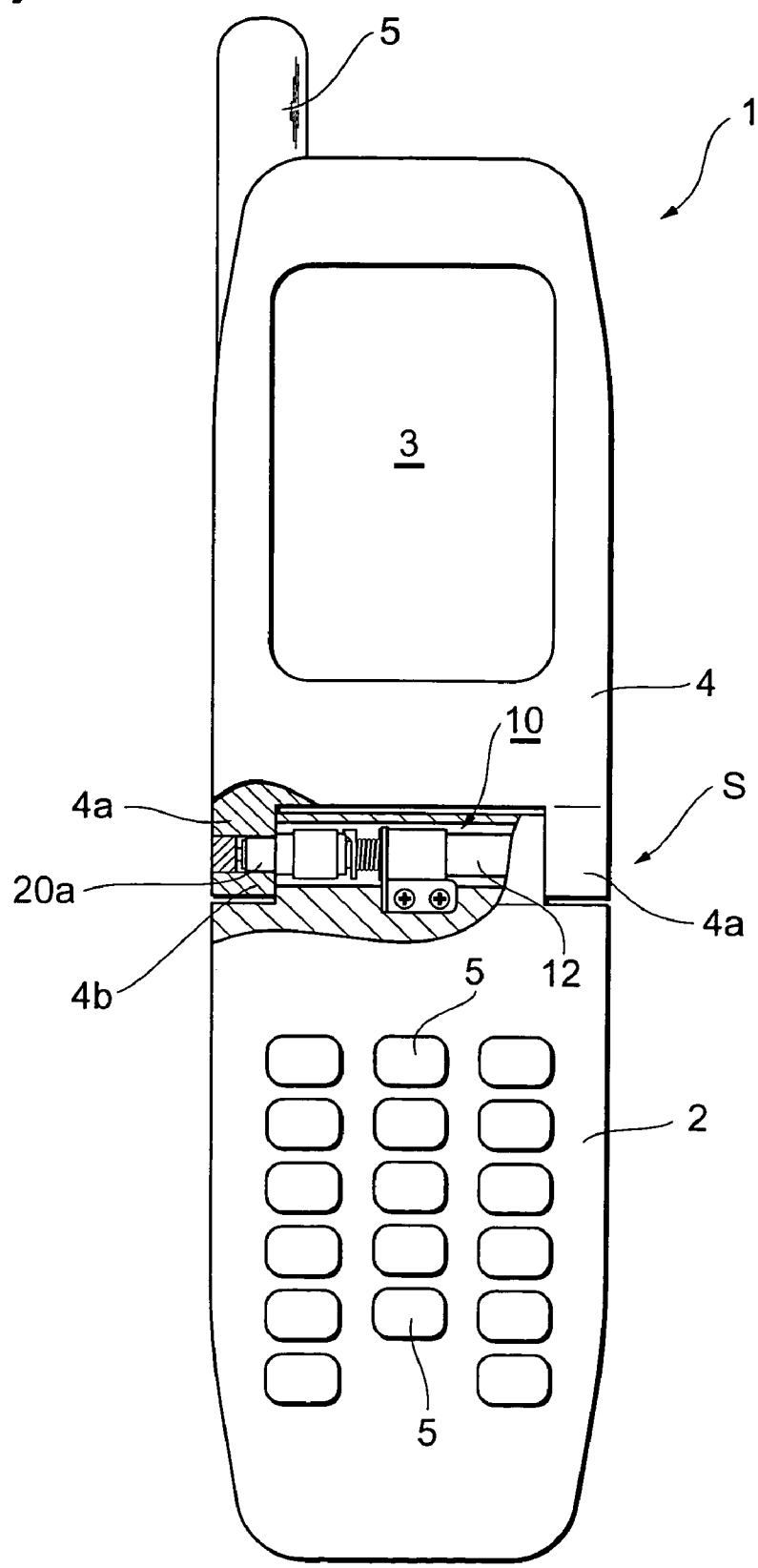
FIG. 1 is a front view showing a flip cell phone to which the electric motorized hinge apparatus according to the present invention is applied.

The electric motorized hinge apparatus according to the present invention is used in an opening/closing operation of a movable object (a lid or the like) mounted in the cell phones, personal digital assistants, notebook computers, etc. and endures application at a place of a narrow space. As shown in FIG. 1, a flip cell phone 1 is mainly composed of a main body 2 in which control buttons 5 of a numeric keypad and others are arranged, a lid portion (movable object) 4 in which a liquid crystal screen 3 is fitted, and an antenna 5 for transmission and reception of radio waves, and the main body 2 and lid portion 4 are hinge-coupled through a shaft so as to permit opening and closing of the lid portion 4. Furthermore, this cell phone 1 is of an electric opening/closing type permitting opening/closing of the lid portion 4 in either use mode of manual operation and electric operation, in which the lid portion 4 can be opened and closed with one hand. For accomplishing it, an electric hinge apparatus 10 is housed in a hinge portion S.

Figure 2:
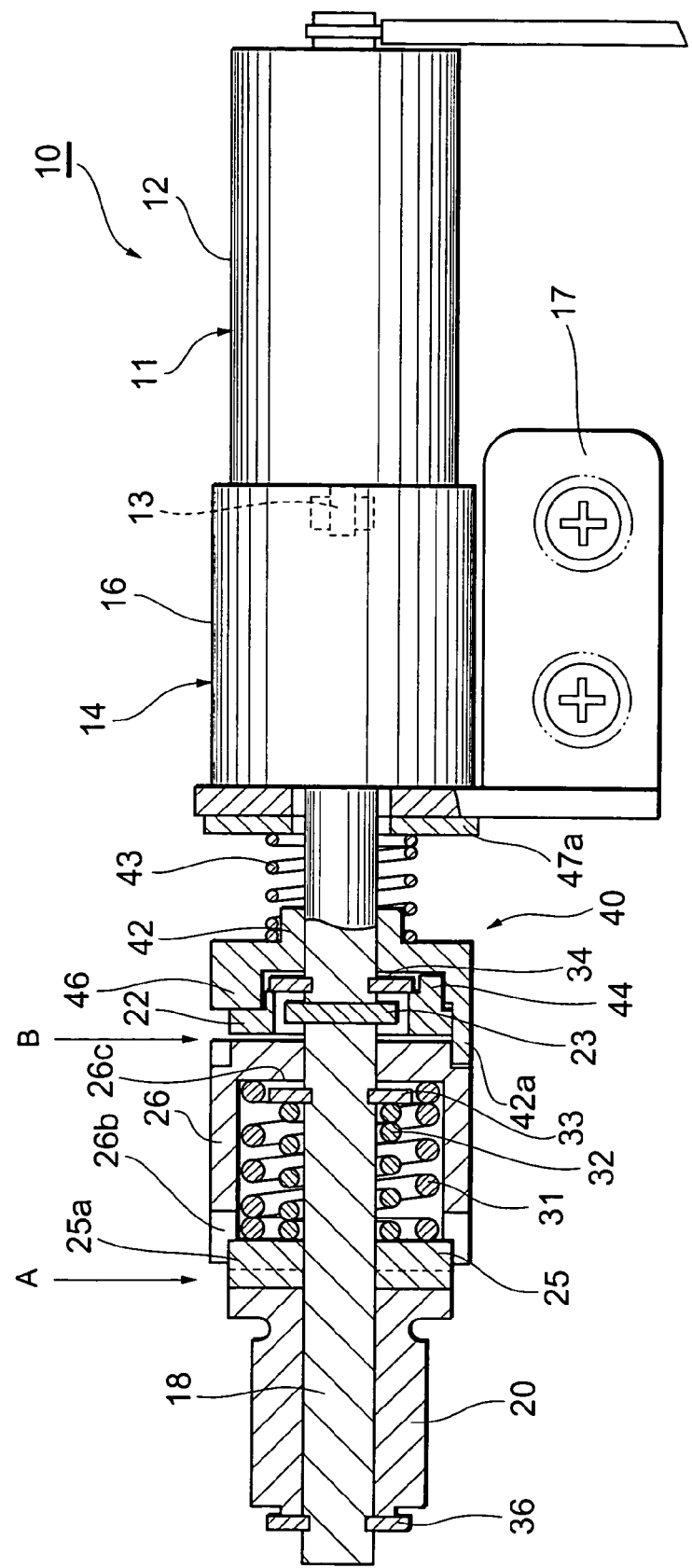
FIG. 2 is a sectional view showing a first embodiment of the electric motorized hinge apparatus according to the present invention.

As shown in FIG. 2, this electric hinge apparatus 10 is provided with a miniature motor 11 as a driving source in a size enough to be incorporated in the hinge portion S of the flip cell phone 1 (e.g., about 6 mm in diameter of the barrel). This motor 11 is a cored motor and has a metal motor case (barrel) 12 of cylindrical shape. Furthermore, a stator consisting of a permanent magnet with N and S poles is fixed to an internal wall surface of this motor case 12, and a rotator with a coil around an iron core is housed inside the motor case 12. A drive shaft 13 supported on bearings is fixed in the center of this rotator, and in the motor case 12 a commutator is fixed to the rear end of drive shaft 13, while a pair of brushes slidingly contact this commutator.

This drive shaft 13 projects out of the motor case 12 to be coupled to a train of reduction gears in gear mechanism 14. This gear mechanism 14 has a gear case 16 of a diameter almost equal to that of the motor case 12, and various gears for achieving desired reduction of speed are housed in this gear case 16. The gear case 16 is provided with a bracket 17 for permitting the gear case to be screwed to the main body 2 of the cell phone 1.

Figure 3:
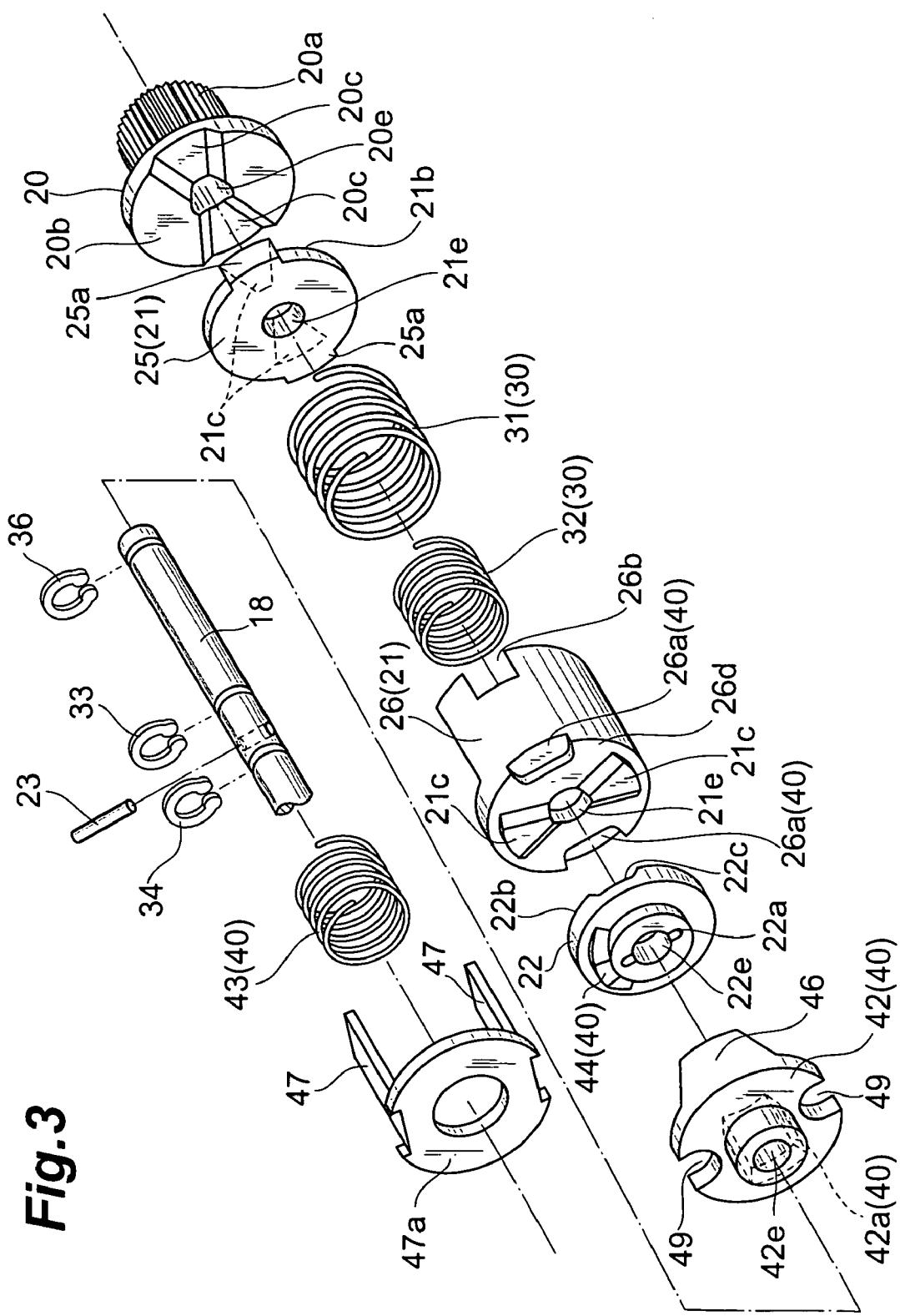
FIG. 3 is an exploded perspective view of the electric motorized hinge apparatus according to the present invention.

An output shaft 18 projects from the front end of this gear mechanism 13. As shown in FIGS. 2 and 3, the distal end of output shaft 18 is set in a center hole 20e of first rotating member 20 with spline part 20a formed in the periphery. This first rotating member 20 is rotatably attached to the output shaft 18, and the spline part 20a is fitted in a boss portion 4b (cf. FIG. 1) provided in arm 4a of the lid portion 4. This spline coupling accomplishes integral motion of the lid portion (movable object) 4 and the first rotating member 20.

A second rotating member 21 adjacent to the first rotating member 20 constitutes a cylindrical container consisting of a first engagement portion 25 of disk shape and a second engagement portion 26 of cup shape. Guide projections 25a projecting radially are provided in the circumference of the first engagement portion 25, and guide grooves 26b extending in the thrust direction for housing the respective guide projections 25a are formed in the second engagement portion 26. When the first engagement portion 25 is integrated with the second engagement portion 26 to constitute the second rotating member 21, the first engagement portion 25 can rotate together with the second engagement portion 26, and freely move in the thrust direction relative to the second engagement portion 26.

Furthermore, the output shaft 18 is set in center hole 21e of the second rotating member 21, and the second rotating member 21 is rotatably attached to the output shaft 18 and coupled through concavo-convex engagement to the first rotating member 20. For example, two recesses 20c of a trapezoid section arranged with a phase angle of 180° are formed in an opposed surface 20b of the first rotating member 20, and two projections 21c of a trapezoid section arranged with a phase angle of 180° are formed in an opposed surface 21b of the first engagement portion 25 in the second rotating member 21 so as to fit in the respective recesses 20c (cf. FIG. 5). Therefore, a first concavo-convex engagement part A is formed by collaboration between recesses 20c and projections 21c. When the first rotating member 20 is rotated in a forward direction and in a backward direction in a state in which the second rotating member 21 is kept at a stop, concavo-convex engagement is achieved every 180° in either of the rotations. The number and phase angle of recesses 20c and projections 21c can be appropriately modified according to specifications of equipment such as cell phone 1.

Furthermore, a third rotating member 22 adjacent to the second rotating member 21 is configured to integrally rotate together with the output shaft 18. The output shaft 18 is set in a center hole 22e of this third rotating member 22, and a pin 23 for prevention of rotation is driven in the direction of diameter into the output shaft 18. Then this pin 23 is put into slit 22a of the third rotating member 22 to implement integral rotation of the third rotating member 22 and the output shaft 18. The third rotating member 22 is coupled through a second concavo-convex engagement part B to the second engagement portion 26 in the second rotating member 21.

Figure 5:
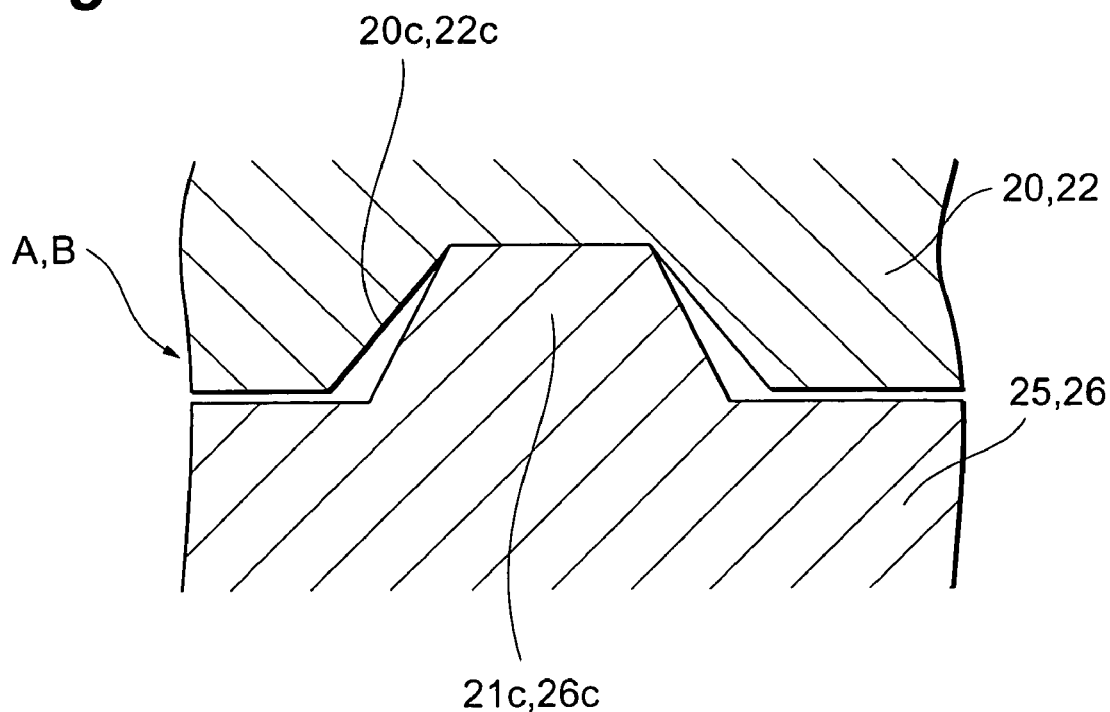
FIG. 5 is an enlarged sectional view of the first and second concavo-convex engagement parts.

For example, two recesses 22c of a trapezoid section arranged with a phase angle of 180° are formed in an opposed surface 22b of the third rotating member 22, and two projections 26c of a trapezoid section arranged with a phase angle of 180° are formed in an opposed surface 26d of the second engagement portion 26 in the second rotating member 21 so as to fit in the respective recesses 22c (cf. FIG. 5). Therefore, the second concavo-convex engagement part B is established by collaboration between recesses 22c and projections 26c. When the third rotating member 22 is rotated in the forward direction and in the backward direction in a state in which the second rotating member 21 is kept at a stop, concavo-convex engagement is achieved every 180° in either of the rotations. The number and phase angle of recesses 22c and projections 26c can be appropriately modified according to specifications of equipment such as cell phone 1.

Furthermore, this apparatus 10 makes use of a biasing means 30 consisting of compression springs, for generating holding forces at the aforementioned first and second concavo-convex engagement parts A, B. This biasing means 30 is located between the first engagement portion 25 provided in the second rotating member 21 and the second engagement portion 26 provided in the second rotating member 21 and is adapted to press the first engagement portion 25 against the first rotating member 20 and to press the second engagement portion 26 against the third rotating member 22. Then holding of the third rotating member 22 on the output shaft 18 is achieved by a rear C-ring 34 fitted on the output shaft 18, and holding of the first rotating member 20 on the output shaft 18 is achieved by a front C-ring 36 fitted on the output shaft 18.

Furthermore, the biasing means 30 is comprised of a first compression spring 31 and a second compression spring 32 housed in the second rotating member 21 of cylindrical shape. The first compression spring 31 is located so as to be wound around the output shaft 18 between the first engagement portion 25 and the second engagement portion 26, and the first compression spring 31 has one end in contact with the first engagement portion 25, and the other end in contact with a bottom surface 26c of the second engagement portion 26. This first compression spring 31 biases the first engagement portion 25 in the thrust direction (axial direction) of the output shaft 18 toward the first rotating member 20, and biases the second engagement portion 26 in the thrust direction toward the third rotating member 22. As a result, in the second rotating member 21, the first engagement portion 25 is pressed against the first rotating member 20, while the second engagement portion 26 is pressed against the third rotating member 22.

The second compression spring 32 is located inside the first compression spring 31 so as to surround the output shaft 18 between the first engagement portion 25 and the second engagement portion 26, and the second compression spring 32 has one end in contact with the first engagement portion 25, and the other end in contact with a spring seat 33 consisting of a C-ring fitted on the output shaft 18. In this configuration, the second compression spring 32 biases only the first engagement portion 25 in the thrust direction (axial direction) toward the first rotating member 20, so as to add an assist force to the spring force of the first compression spring 31 in the first concavo-convex engagement part A.

When the biasing means 30 is comprised of the first compression spring 31 and the second compression spring 32 as in this configuration, the forces of the two springs are applied at the first concavo-convex engagement part A, and the force of one spring is applied at the second concavo-convex engagement part B. Accordingly, the holding force at the second concavo-convex engagement part B can be made weaker than that at the first concavo-convex engagement part A, and it thus becomes feasible to raise the force of manually rotating the lid portion 4, i.e., the so-called manual rotational force, while keeping the torque load small at a start of the motor. This configuration is effective in opening/closing of the lid portion in the cell phones, personal computers, and so on.

Furthermore, the electric hinge apparatus 10 has a lock means 40 for achieving manual opening/closing of the lid portion 4, and this lock means 40 locks the second rotating member 21 during a stop of the motor 11 but unlocks the second rotating member 21 during driving of the motor 11. This lock means 40 has a stopper member 42 of disk shape for locking and unlocking of the second rotating member 21, and this stopper member 42 is located adjacent to the third rotating member 22 and arranged to slide in the thrust direction along the output shaft 18 set in center hole 42e.

Figure 4:
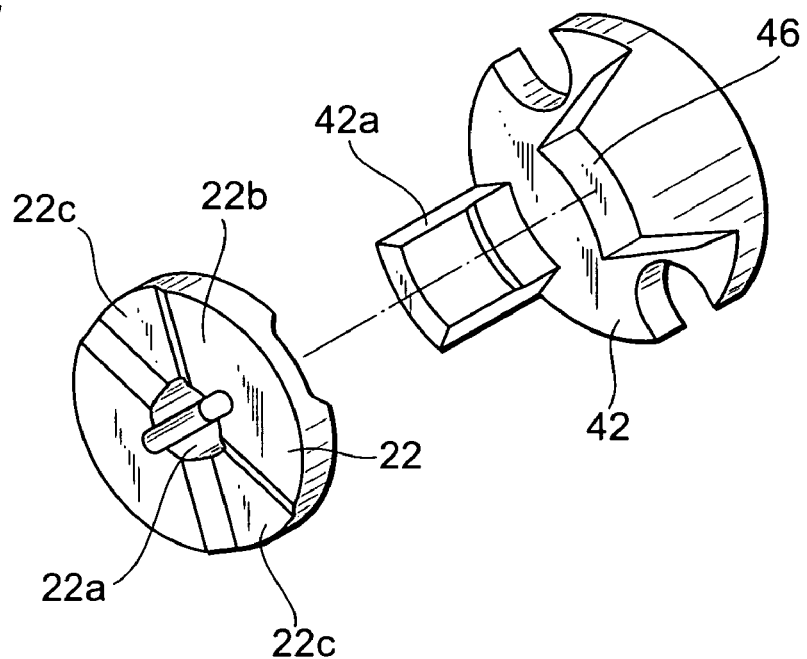
FIG. 4 is a perspective view showing a stopper member and a third rotating member.

Furthermore, the stopper member 42 has an integrally formed claw portion 42a projecting in the thrust direction from a part of the periphery toward the second rotating member 21 (cf. FIG. 4). Corresponding to it, two pocket portions 26a for the claw portion 42a to be put thereinto in the thrust direction are formed in partial regions of the peripheral portion of the second engagement portion 26 in the second rotating member 21, and the paired pocket portions 26a are arranged with a phase angle of 90° relative to the projections 26c. The claw portion 42a drops into the pocket portion 26a every 180° rotation of the second rotating member 21. When the claw portion 42a drops into the pocket portion 26a, the second rotating member 21 is locked. When the claw portion 42a leaves the pocket portion 26a, the second rotating member 21 is unlocked.

For appropriately effecting the locking and unlocking, a compression spring 43 as a biasing means is located between the stopper member 42 and the gear mechanism 14. This compression spring 43 has one end in contact with the stopper member 42 side and the other end in contact with the gear mechanism 14 side, whereby the stopper member 42 is biased toward the second rotating member 21. Furthermore, for effecting the unlocking in the thrust direction, an unlocking cam portion 44 projecting in the thrust direction toward the stopper member 42 to constitute an end face cam is provided in a partial region of the peripheral portion of the third rotating member 22. Corresponding to it, a mountain-shaped projection (follower) 46 projecting in the thrust direction is provided in a partial region of the stopper member 42, in order to move the stopper member 42 backward in collaboration with the cam portion 44 (cf. FIG. 4). Accordingly, as the cam portion 44 pushes the projection 46, the stopper member 42 can be moved backward in the thrust direction against the biasing force of the compression spring 43.

In order to securely guide the forward and backward motion of the stopper member 42 in the thrust direction, guide strips 47 extending in the thrust direction are fixed through bracket 47a to the distal end of the gear case 16. The guide strips 47 are inserted in cuts 49 formed in partial regions of the peripheral portion of the stopper member 42, in order to achieve prevention of rotation of the stopper member 42.

The operation of the electric hinge apparatus 10 will be briefly described below on the basis of the above structure.

Figure 6:
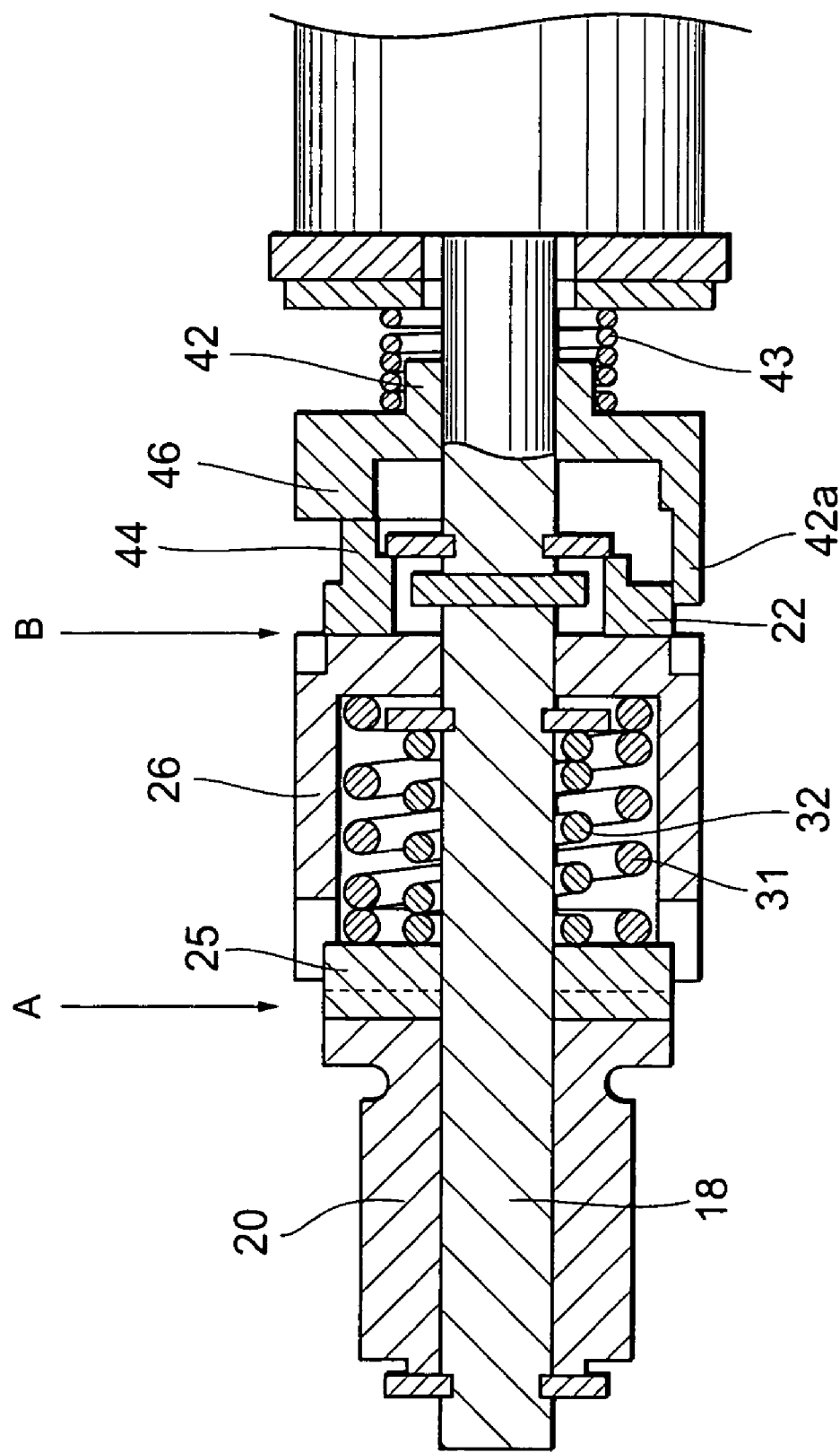
FIG. 6 is an enlarged sectional view showing a state after 90° rotation of the third rotating member from the initial position in FIG. 2.

First, in a case where the lid portion 4 of cell phone 1 is electrically opened with one hand, the user turns on a lid opening/closing switch (not shown) provided on the side face of the main body 2 to activate the motor 11. Then the third rotating member 22 starts rotating forward with forward rotation of the output shaft 18, and the unlocking cam portion 44 rotates 90° from the initial position (cf. FIG. 2) together with the third rotating member 22 in conjunction with the rotation of the output shaft 18. At this time, the cam portion 44 pushes the projection 46 of the stopper member 42 against the biasing force of the spring 43, so as to move the claw portion 42a of the stopper member 42 back in the thrust direction (cf. FIG. 6). As a result, the claw portion 42a leaves the pocket portion 26a provided in the second engagement portion 26 to achieve unlocking, so that the second rotating member 21 goes into a freely rotatable state. At this time, in the second concavo-convex engagement part B, the projections 26c are fitted in the recesses 22c, so that the second rotating member 21 rotates to follow the third rotating member 22, through a predetermined engaging force.

Once the second rotating member 21 starts rotating, the pocket portions 26a also move in the rotating direction. Therefore, after the stopper member 42 becomes not affected by the cam portion 44, the claw portion 42a is kept in contact with the second rotating member 21 by the biasing force, without falling into the pocket portion 26a.

Since the first rotating member 20 is maintained in a concavo-convex holding state at the concavo-convex engagement part A by the first compression spring 31 and the second compression spring 32 relative to the first engagement portion 25 in the second rotating member 21, the first rotating member 20 rotates to follow the second rotating member 21, and the lid portion 4 rotates to follow the rotation of the first rotating member 20. After the lock state is released in this way, the rotational force of the output shaft 18 is sequentially transferred from the third rotating member 22 to the first rotating member 20 to start the opening operation of the lid portion 4. In a state in which the lid portion 4 is completely opened, a point of time when the claw portion 42a is fitted in the pocket portion 26a is determined through detection by an unrepresented photosensor to automatically stop the driving of motor 11.

In contrast, where the lid portion 4 is electrically closed with one hand, the user turns on the lid opening/closing switch (not shown) provided on the side face of the main body 2 to activate the motor 11. Then the output shaft 18 starts rotating backward to initiate the backward rotation of the third rotating member 22. Then the claw portion 42a leaves the pocket portion 26a through collaboration between cam portion 44 and projection 46. Once the lock state is released, the rotational force of the output shaft 18 is sequentially transferred from the third rotating member 22 to the first rotating member 20 to start the closing operation of the lid portion 4. In a state in which the lid portion 4 is completely closed, a point of time when the claw portion 42a is fitted in the pocket portion 26a is determined through detection by an unrepresented photosensor to automatically stop the driving of motor 11.

In a case where the user forcedly stops the opening/closing operation in the middle of the electric opening/closing of the lid portion 4, the third rotating member 22 starts idling at the second concavo-convex engagement part B having the holding force weaker than that at the first concavo-convex engagement part A. As a result, the output shaft 18 starts idling, so that no excessive load is applied to the gear mechanism 14, thus avoiding an incident of damage to the gear train in the gear mechanism 14.

In a case where the lid portion 4 is manually opened and closed, the motor 11 is maintained in the off state, and the claw potion 42a is fitted in the pocket portion 26a to achieve locking. Therefore, the second rotating member 21 is kept at a stop. In the manual opening/closing of the lid portion 4, the engagement at the concavo-convex engagement part A is thus released, so that the lid portion 4 can be freely opened and closed by hand. At a moment of completely opening or closing the lid portion 4, the projections 21c are drawn into the recesses 20c because of the biasing force of the biasing means 30, which provides an appropriate click feeling at the maximum opening position of the lid portion 4. As described above, the foregoing electric hinge apparatus 10 involves the appropriate consideration to the two types of opening and closing operations including the manual opening/closing and electric opening/closing of the lid portion 4, while making up for the lack of torque of the miniature motor 11 by employment of the gear mechanism 14, and is thus extremely effective in promotion of miniaturization.

Figure 7:
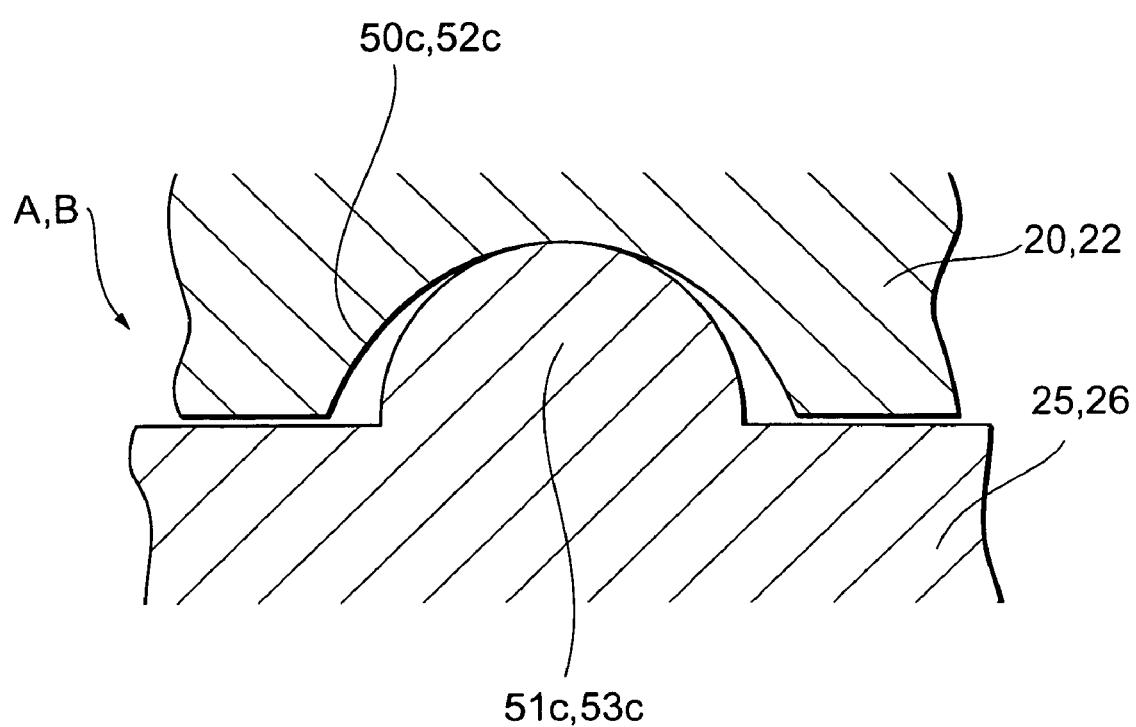
FIG. 7 is an enlarged sectional view showing another example of the first and second concavo-convex engagement parts.

It is noted that the present invention is by no means intended to be limited to the above embodiment. For example, as shown in FIG. 7, it is also possible to adopt recesses 50c of an arcuate section and projections 51c of a semicircular section at the first concavo-convex engagement part A. Similarly, it is also possible to adopt recesses 52c of an arcuate section and projections 53c of a semicircular section at the second concavo-convex engagement part B.

What is claimed is:

1. An electric hinge apparatus for rotating a movable object by a motor provided with a gear mechanism, the electric hinge apparatus comprising:
    a first rotating member rotatably attached to an output shaft interlocking with the gear mechanism, the first rotating member being affixed to the movable object;
    a second rotating member rotatably attached to the output shaft and detachably coupled through a first concavo-convex engagement part to the first rotating member;
    a third rotating member adapted to integrally rotate together with the output shaft at all times and detachably coupled through a second concavo-convex engagement part to the second rotating member;
    biasing means located between a first engagement portion provided in the second rotating member and a second engagement portion provided in the second rotating member, the biasing means being adapted to press the first engagement portion against the first rotating member and to press the second engagement portion against the third rotating member; and
    lock means for locking the second rotating member to the third rotating member during a stop of the motor, and for unlocking the second rotating member during activation of the motor.

2. The electric motorized hinge apparatus according to claim 1, wherein the biasing means comprises:
    a first compression spring located so as to surround the output shaft between the first engagement portion and the second engagement portion, the first compression spring having one end in contact with the first engagement portion and another end in contact with the second engagement portion; and
    a second compression spring located inside the first compression spring so as to surround the output shaft between the first engagement portion and the second engagement portion, the second compression spring having one end in contact with the first engagement portion and another end in contact with a spring seat provided on the output shaft.

3. The electric motorized hinge apparatus according to claim 1, wherein the lock means comprises:
    a stopper member located adjacent to the third rotating member and adapted to slide in a thrust direction along the output shaft;
    a claw portion projecting in the thrust direction from the stopper member;
    a pocket portion provided in the second engagement portion in the second rotating member and adapted to permit a tip of the claw portion to be inserted in the thrust direction;
    biasing means for biasing the stopper member toward the second rotating member; and
    an unlocking cam portion projecting in the thrust direction from the third rotating member, located between the second engagement portion and the stopper member, toward the stopper member and adapted to move the stopper member in the thrust direction against a biasing force of the biasing means.

4. The electric motorized hinge apparatus according to claim 1, wherein the lock means includes a stopper member that locks the second rotating member to the third rotating member during a stop of the motor and for unlocks the second rotating member during activation of the motor by sliding with the third rotating member as it rotates.

5. A mobile communication terminal comprising the electric hinge apparatus recited in claim 1, the electric hinge apparatus utilized in an operation of opening and closing a lid.

6. An electric hinge apparatus for rotating a movable object by a motor provided with a gear mechanism, the electric hinge apparatus comprising:
    a first rotating member rotatably attached to an output shaft interlocking with the gear mechanism, the first rotating member being adapted to be coupled to the movable object;
    a second rotating member rotatably attached to the output shaft and coupled through a first concavo-convex engagement part to the first rotating member;
    a third rotating member adapted to integrally rotate together with the output shaft and coupled through a second concavo-convex engagement part to the second rotating member;
    biasing means located between a first engagement portion provided in the second rotating member and a second engagement portion provided in the second rotating member, the biasing means being adapted to press the first engagement portion against the first rotating member and to press the second engagement portion against the third rotating member and wherein the biasing means includes:
    a first compression spring located so as to surround the output shaft between the first engagement portion and the second engagement portion, the first compression spring having one end in contact with the first engagement portion and another end in contact with the second engagement portion; and
    a second compression spring located inside the first compression spring so as to surround the output shaft between the first engagement portion and the second engagement portion, the second compression spring having one end in contact with the first engagement portion and another end in contact with a spring seat provided on the output shaft; and
    lock means for locking the second rotating member during a stop of the motor.

7. An electric hinge apparatus for rotating a movable object by a motor provided with a gear mechanism, the electric hinge apparatus comprising:
    a first rotating member rotatably attached to an output shaft interlocking with the gear mechanism, the first rotating member being adapted to be coupled to the movable object;
    a second rotating member rotatably attached to the output shaft and coupled through a first concavo-convex engagement part to the first rotating member;

a third rotating member adapted to integrally rotate together with the output shaft and coupled through a second concavo-convex engagement part to the second rotating member;

biasing means located between a first engagement portion provided in the second rotating member and a second engagement portion provided in the second rotating member, the biasing means being adapted to press the first engagement portion against the first rotating member and to press the second engagement portion against the third rotating member;

lock means for locking the second rotating member during a stop of the motor wherein the lock means comprises:

a stopper member located adjacent to the third rotating member and adapted to slide in a thrust direction along the output shaft;

a claw portion projecting in the thrust direction from the stopper member;

a pocket portion provided in the second engagement portion in the second rotating member and adapted to permit a tip of the claw portion to be inserted in the thrust direction;

biasing means for biasing the stopper member toward the second rotating member; and an unlocking cam portion projecting in the thrust direction from the third rotating member, located between the second engagement portion and the stopper member, toward the stopper member and adapted to move the stopper member in the thrust direction against a biasing force of the biasing means.

* * * * *